UNITED STATES PATENT OFFICE.

FRITZ ZUCKMAYER, OF ELBERFELD, GERMANY, ASSIGNOR TO DR. WALTHER WOLFF AND COMPANY, GESELLSCHAFT MIT BESCHRANKTER HAFTUNG, OF ELBERFELD, GERMANY.

ART OF MAKING IRON-ALBUMINOUS COMPOUNDS.

1,036,405.     Specification of Letters Patent.     Patented Aug. 20, 1912.

No Drawing.     Application filed December 1, 1911. Serial No. 663,359.

*To all whom it may concern:*

Be it known that I, FRITZ ZUCKMAYER, citizen of the German Empire, residing at Elberfeld, Kingdom of Prussia, Germany, have invented certain new and useful Improvements in the Art of Making Iron-Albuminous Compounds; and I do hereby declare the following to be a full, clear, and exact description of the invention, such as will enable others skilled in the art to which it appertains to make and use the same.

This invention relates to the manufacture of iron-albuminous substances and has particular reference to the preparation of albuminous compounds containing iron and phosphorus in combination with arsenic.

The object of the invention is to obtain albuminous compounds containing iron and combined with phosphorus and arsenic in such a manner as to be available as therapeutic agents and in a condition in which they will not disagreeably affect the stomach and in which they will be readily dissolved in the intestines and properly assimilated by the human organism.

In my applications Serial Nos. 569703 and 621234, filed June 30, 1910 and April 15, 1911, respectively, I have described methods consisting in causing an iron salt and metaphosphoric acid, or a salt or compound containing the metaphosphoric acid radical, to react on an albuminous substance or upon a halogen derivative of such albuminous substance, and the new compounds resulting from such methods. I have found that these methods may be modified by replacing a portion of the metaphosphoric acid or salt thereof by arsenic acid or metarsenic acid, or arsenic pentoxid or other hydrates of arsenic pentoxid, or a salt of an arsenic acid, such modified process leading to compounds in which more or less arsenic is bound according as the relative proportions of the phosphoric and the arsenic compound added are varied.

In preparing the new compounds, either the simple albuminous compounds or their products of decomposition, such as albumoses or peptones or their halogen derivatives may be employed as starting materials, as in the aforesaid prior applications, the resultant new products exhibiting similar properties to those of the products covered in the same, together with the therapeutic advantages due to arsenic. In particular they are insoluble in a mixture of pepsin and hydrochloric acid and soluble in a dilute solution of alkali such as sodium carbonate. More in detail it is to be stated that the products made according to the present invention are all distinguished by being insoluble in a deci-normal solution of hydrochloric acid whether such solution be warm or cold. Another property of these new products is that on being treated with nitric acid solution and warming, yellow precipitates or secretions are separated therefrom.

In order to fully disclose my invention, I will now proceed to describe several examples of the preferred manner of carrying the same into effect.

Example 1: 5 kilograms of casein are dissolved in 200 liters of water by adding thereto one kilogram of sodium hydrate solution of a strength of 38° Baumé. To this solution are added 750 grams of a solution of metaphosphoric acid such as is found in the trade and thereupon 25 grams of arsenic acid solution is added whereby a white precipitate is formed. There are then added to the mixture 5 liters of a 50 per cent. solution of ferric chlorid ($Fe_2Cl_6$) and thereupon a dilute ammonia solution is introduced until solution occurs. From this solution the new compound is precipitated by the addition of dilute hydrochloric acid, the precipitate so obtained being subsequently washed, pressed and dried. The new iron albuminous compound so obtained contains about 1.5 per cent. of arsenic, 8 per cent. of iron, 8 per cent. of phosphoric acid anhydrid and 10.2 per cent. of nitrogen.

Example 2: 5 kilograms of dried white of egg are dissolved in 150 liters of water and to the solution so prepared 4 liters of a 50 per cent. ferric chloric solution are added, whereby a yellowish-brown precipitate is formed. To this mixture there is then added an aqueous solution of 100 grams of arsenic acid and an aqueous solution of 900 grams of vitreous phosphoric acid, the whole being then rendered feebly alkaline by the addition thereto of dilute soda lye (sodium hydrate solution). Dilute hydrochloric acid is then added to this solution and the resultant precipitate separated by filtration, washed and dried. The new product obtained by this method contains about 0.7 per cent. of arsenic, combined with 10 per cent. of iron, 12.5 per cent. of phosphoric acid anhydrid and 8.7 per cent. of nitrogen.

Example 3: 4 kilograms of iodized protalbumose of casein, prepared in the usual manner, are dissolved in 150 liters of water with the aid of dilute ammonia solution and to the solution so obtained there is added an aqueous solution of 750 grams of vitreous phosphoric acid and an aqueous solution of 250 grams of arsenic acid. A yellowish-white precipitate is thereby formed. 3 liters of a 50 per cent. solution of ferric chlorid is now added to the whole and the mixture reduced to a state of solution by the addition of a sufficient quantity of dilute ammonia solution, from which solution the new product is then thrown down by the addition of dilute hydrochloric acid, separated by filtering, washed and dried as in the preceding examples. The new product contains substantially 1.3 per cent. of arsenic, 6.5 per cent. of iron, 12.6 per cent. of phosphoric acid anhydrid and 10 per cent. of nitrogen.

The new products obtained by the methods described for the three above examples are distinguished by the following properties: They are insoluble in a deci-normal solution of hydrochloric acid at ordinary temperatures and on heating, but soluble in dilute solutions of alkalis and alkali-carbonates. They are therefore, insoluble in the stomach, whereas they readily go into solution in the intestines so as to be there assimilated. They are insoluble in a hydrochloric acid solution of 6° Baumé. Upon heating the new products together with nitric acid yellow excretions are separated therefrom. When dissolving one of these products in a one-half per cent. soda (sodium-hydrate) solution and adding ammonium-sulfid [$(NH_4)_2S$] a green coloration without precipitate is obtained. Phosphoric acid can be detected in the new compounds only after decomposition or incinerating or burning them.

The new compounds possess valuable therapeutic properties and serve as remedies in anemic and chlorotic disorders of all kinds; also in cases of nervous debility and hysterics. It may be employed with advantage for convalescents, and in cases of persistent and obstinate skin-diseases. The dose is governed by the content of arsenic and in general is to be fixed as five one-thousandths of a gram (0.005 gr.) of arsenic per day for adults, which dose may in certain cases be doubled. For children a quantity containing a smaller amount of arsenic is to be prescribed.

The order in which the reagents are caused to act on each other may be varied without changing the product of the reaction, as will be observed from the examples given. The relative quantities in which these reagents or starting materials are combined is such that after the mixture has been effected a solution is formed and no precipitate occurs on adding a dilute alkali in sufficient quantity to produce feeble alkaline reaction.

Instead of arsenic acid or arsenic pentoxid employed in the examples given, other hydrates of the pentoxid or a salt of the various arsenic acids may be employed for the purposes of this invention.

Claims:

1. The process which consists in causing an iron compound and a compound containing the metaphosphoric acid radical and an arsenic compound to react on an albuminous compound.

2. The process which consists in causing an iron compound and a compound containing the metaphosphoric acid radical and an arsenic compound to react on an albuminous compound in such relative proportions that a solution is formed on rendering the resultant mixture feebly alkaline.

3. The process which consists in causing an iron compound and a compound containing the metaphosphoric acid radical and a compound containing the radical of arsenic acid, to react on an albuminous compound.

4. The process which consists in causing an iron compound and a compound containing the metaphosphoric acid radical and a compound containing the radical of arsenic acid, to react on an albuminous compound in such relative proportions that a solution is formed on rendering the resultant mixture feebly alkaline.

5. The process which consists in causing an iron salt, a compound containing the metaphosphoric acid radical and arsenic acid to react on an albuminous compound.

6. The process which consists in causing an iron salt, a compound containing the metaphosphoric acid radical and arsenic acid to react on a solution of an albuminous compound.

7. The process which consists in causing an iron salt, metaphosphoric acid and arsenic acid to react on an albuminous compound.

8. The process which consists in causing an iron salt, a compound containing the metaphosphoric acid radical and arsenic acid to react on an albuminous compound, and then adding dilute ammonia until solution occurs.

9. As a new composition of matter, an iron albuminous compound containing phosphorus and arsenic and having the following properties: it is insoluble in a decinormal solution of hydrochloric acid at ordinary temperatures and on heating, but soluble in dilute solutions of alkalis and alkaline carbonates; on heating the new products with nitric acid yellow excretions are separated therefrom; when dissolving in a one-half per cent. sodium hydrate solution and adding ammonium sulfid a green coloration is obtained; the phosphorus can be detected only after decomposing, incinerating or burning the compound.

In testimony whereof I hereunto affix my signature in the presence of two witnesses.

FRITZ ZUCKMAYER. [L. S.]

Witnesses:
 HELEN NUFER,
 ALBERT NUFER.